United States Patent [19]

Hladun

[11] 4,320,709
[45] Mar. 23, 1982

[54] HAZARDOUS MATERIALS INCINERATION SYSTEM

[75] Inventor: Kenneth W. Hladun, Narberth, Pa.
[73] Assignee: Pyro-Sciences, Inc., Mt. Laurel, N.J.
[21] Appl. No.: 191,950
[22] Filed: Sep. 29, 1980
[51] Int. Cl.³ .............................................. F23G 3/00
[52] U.S. Cl. ..................... 110/235; 110/210; 110/212; 110/214; 110/215; 110/216; 110/237
[58] Field of Search .............. 110/235, 238, 246, 210, 110/211, 212, 214, 215, 216, 346, 237

[56] References Cited

U.S. PATENT DOCUMENTS

| | | | |
|---|---|---|---|
| 3,604,375 | 9/1971 | Bruns et al. | 110/238 |
| 3,722,433 | 3/1973 | Kramer | 110/238 |
| 3,848,548 | 11/1974 | Bolejack et al. | 110/215 X |
| 3,985,085 | 10/1976 | Schroder | 110/238 |
| 4,223,614 | 9/1980 | Barkhuus et al. | 110/238 |
| 4,245,571 | 1/1981 | Prezewalski | 110/216 X |
| 4,269,806 | 5/1981 | Yaguchi et al. | 110/215 X |
| 4,277,362 | 7/1981 | Mallek et al. | 110/237 X |

Primary Examiner—Edward G. Favors
Attorney, Agent, or Firm—Weiser, Stapler & Spivak

[57] ABSTRACT

A hazardous materials incineration system is disclosed which includes a solid waste combustor of the inclined, oscillating or rocking type and a liquid waste combustor suitable to incinerate wastes in liquid form. The combustion products from both the solid waste combustor and the liquid waste combustor are fed to an afterburner which is equipped with burners to maintain elevated temperatures throughout the length of the afterburner chamber. The products of combustion exit the afterburner into a conditioning unit which eliminates larger particulate matter, cools the combustion products and releases certain additives into the moving gas stream prior to entry into a baghouse. All neutralized salts are withdrawn at the baghouse and the gaseous baghouse effluent is directed to a further aqueous liquor contact apparatus prior to exhausting to atmosphere through a forced draft stack system.

20 Claims, 3 Drawing Figures

HAZARDOUS MATERIALS INCINERATION SYSTEM

BACKGROUND OF THE INVENTION

The present invention relates generally to the field of industrial incineration plants, and more particularly, is directed to a novel hazardous materials incineration system capable of incineration and destruction of a wide variety of materials in a safe and pollution controlled environment.

Prior workers in the art have designed and constructed numerous types of incineration systems suitable for handling both municipal wastes and industrial wastes. For example, Bruns et al. in U.S. Pat. No. 3,604,375, show an incineration system capable of handling combinations of solid, semi-liquid and liquid waste materials in a furnace to produce a combustible gaseous stream and then seek to achieve complete combustion in a second furnace to produce a non-combustible gaseous stream. In this system, the two effluents from the first and second furnaces are fed to an afterburner without the addition of auxiliary heat.

In U.S. Pat. No. 3,848,548, Bolejack Jr. et al. show an incineration system for the disposal of hazardous materials such as explosives which includes a rotating kiln of the type having provision for the introduction of a burner in combination with an afterburner. The heated gases from the afterburner are treated in a precooler and in a wet scrubber prior to an exhaust to atmosphere.

In a plant particularly designed for the incineration of industrial wastes, Schuster in U.S. Pat. No. 3,884,162 shows a rotary furnace and an afterburner which receives the discharge from the furnace and which includes a heat exchanger to feed a steam generator. A flue gas washing apparatus is employed downstream of the steam generator to clean the flue gases prior to exhaustion into the stack.

Despite the considerable efforts in this field by the prior art workers, the need remains for an efficient, self contained, economical, integrated plant capable of the incineration of a wide variety and combination of waste materials, both liquid and solid, which may or may not contain toxic or otherwise hazardous ingredients by utilizing the apparatus components in various combinations to optimumly produce greater efficiency and most complete destruction in a pollution controlled manner.

SUMMARY OF THE INVENTION

This invention relates generally to the field of waste disposal, and more particularly, is directed to a hazardous materials incineration system capable of processing either solid waste, liquid waste or sludge in substantially any proportions or amounts.

In accordance with the design parameters of the present invention, a solids combustor of the inclined oscillating type is breeched into an afterburner. One such solids combustor is disclosed in Bauer U.S. Pat. No. 3,847,095 and has been commercially promoted by the assignee of the present application under the trademark "ROC A JET". After initial light off is achieved, no supplemental fuel will be required. A novel liquids combustor is provided in addition to the solids combustor and is preferably equipped with an air atomized fuel oil burner. Details of the burner form the subject matter of a co-pending application prepared by the applicant entitled "Burner", filed Sept. 29, 1980, Ser. No. 191,931. The burner includes turbulent fluid mixing means and may have oxygen enrichment capability both in the primary air and secondary air connections. Preferably, the liquid combustor is breeched into the afterburner in a position that is angularly offset from the axis of the solids combustor.

In the preferred embodiment, the afterburner is equipped with a plurality of oil or gas burners which are designed and employed to insure certain minimum conditions of temperature and excess oxidizers in all of the products of combustion from both the solids combustor and the liquids combustor at elevated temperatures. The effluent from the afterburner is guided through an air pollution control system comprising generally a conditioning unit of counter-current or co-current spray quench type and which employs an aqueous liquor of controlled but varying composition and automatically controlled pH. The quench tank reduces the high temperature of the combustion products by evaporation and releases certain scrubbed out chemicals as well as specific additives which enhance the downstream collection efficiency of various pollutants. The equilibrium mixture of combustion products and evaporated liquid along with such particulate matter as may be released into or exist in the moving gas stream enters the baghouse. The particulate phase of the moving gas stream includes substances which precoat the bags in the baghouse. The baghouse receives the gaseous effluent from the quench tank and functions to withdraw all neutralized salts and other solid particulates as well as certain gaseous components. The partially cleaned equilibrium mixture of gases exit the baghouse and include the moisture evaporated in the conditioner at elevated temperatures in the 500° F. range and are then directed to a packed column or other scrubber wherein a large portion of the moisture in the exhaust gas is condensed and directed to a drain. In a preferred embodiment the pollution control train comprises a conditioner, a baghouse, a scrubber, a varying depth packed bed and demister train.

Suitable controls are provided throughout to assure automatic, efficient operation to carefully and fully control flow rates, temperatures, oxygen enrichment requirements, fuel requirements and water requirements during and in all phases and components of the system to assure economical, safe, and environmentally acceptable performance.

It is therefore an object of the present invention to provide an improved hazardous materials incineration system of the type set forth.

It is another object of the present invention to provide a novel hazardous materials incineration system which comprises an afterburner equipped with a plurality of fuel fed burners and which is designed to receive the effluent from both a solids waste combustor and a liquids waste combustor and to alternately or simultaneously treat the products of combustion developed by the combustors.

It is therefore another object of the present invention to provide a novel hazardous materials incineration system comprising solid waste combustion means and liquid waste combustion means, both of which are breeched in angularly offset arrangement into a common afterburner, a spray conditioning chamber, a baghouse, a scrubber and a demister train together with a system of automatic controls as required for an efficient and pollution controlled operation.

It is another object of the present invention to provide a novel hazardous materials incineration system suitable for the incineration of a wide variety of waste materials including solids, liquids and sludges, some of which may contain toxic and hazardous components and which includes an independently fired solids combustor and an independently fired liquids combustor, both of which combustors are breeched into an afterburner and means to treat the gaseous effluent from the afterburner to remove particulates and other pollutents prior to exhaustion to atmosphere.

It is another object of the present invention to provide a novel hazardous materials incineration system that is compact in design, highly efficient in operation and trouble free when in use.

Other objects and a fuller understanding of the invention will be had by referring to the following description and in claims of a preferred embodiment thereof, taken in conjunction with the accompanying drawings, wherein like reference characters refer to similar parts throughout the several views and in which:

DESCRIPTION OF THE PREFERRED EMBODIMENT OF THE INVENTION

Figure 1A:
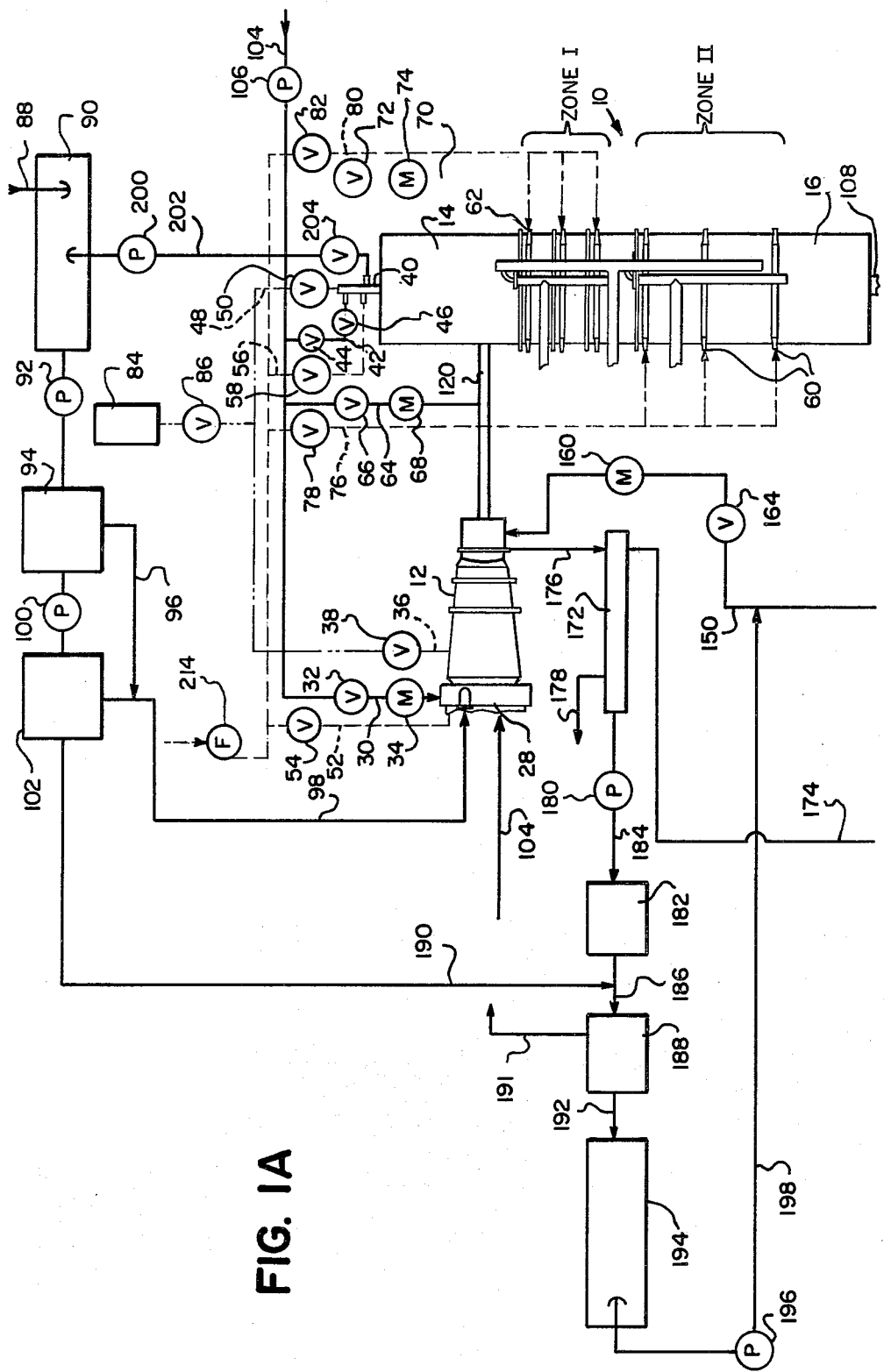
FIGS. 1A and 1B represent a diagrammatic plan view showing generally the arrangement of the major equipment components and the water, oil, air, oxidizer, waste and flue gas flow paths through the plant.

Although specific terms are used in the following description for the sake of clarity, these terms are intended to refer only to the particular structure of the invention selected for illustration in the drawings and are not intended to define or limit the scope of the invention.

Referring now to the drawings, there is illustrated an incineration system generally designated 10 which comprises a solids combustor 12 and a liquids combustor 14, both of which are breeched into an afterburner 16 in angular orientation as illustrated. Preferably, the angle between the axis of the solids combustor 12 and the axis of the liquids combustor 14 is ninety degrees. The gases of combustion exit from the afterburner and enter the conditioner chamber 18 which preferably is of the spray type utilizing an aqueous liquor of predetermined composition. The entry temperature of the afterburner effluent gases into the chamber 18 will be between 2200° F. and 3000° F.; the exit temperature of the equilibrium mixture of combustion products, evaporated moisture and released chemical agents will be in the range of approximately 400° F. to 600° F. In the conditioner 18, the solution composition and pH will be automatically controlled from an additive feeder system 138, 140. Scrubbed out chemicals will be released in substantially solid form by evaporation and additionally, some of the salts in solution will be released through the drain line 110 at this stage.

Particulate matter still present in the exhaust gases will be directed to the baghouse 20 which includes a plurality of high temperature bags (not shown) of known design. The baghouse 20 serves to trap particulate matter present in the flue gases within the high temperature bags for subsequent disposal, as indicated by the disposal line 122. Temperatures within the baghouse will be in the 500° F. range and liquid which actually will be in the form of vapor, passes through the baghouse 20 to the scrubber system 22 which is preferably of the packed column type. In the scrubber system 22, the remaining flue gases are contacted with a treatment liquor containing a predetermined composition, which may be an alkaline solution, which is similar to the conditioner liquor. Moisture is condensed in the scrubber system, the remaining gases are permitted to rise within the scrubber, and the condensed moisture is directed to the drain, as schematically indicated by the drain line 132. The cleaned effluent gases from the scrubber system 22 are then exhausted to atmosphere through the induced draft fan 24 and the stack 26 in known manner as indicated by the gas exhaust duct 134 and the stack exhaust duct 136.

The incineration system 10 is of multiple combustion chamber design and includes the solids combustor 12 which is an underfire, slowly oscillating combustion chamber including an oil or other burner 28 which is utilized only for initial light off or to maintain temperature conditions when the solids combustor is not being fed. Primary combustion air or other suitable fluid can be supplied by the fan 214 through the branch line 52 and valve 54. No supplemental fuel to the burner 28 is normally required after the solid waste material (not shown) has initially been sufficiently ignited. It is contemplated that the solids combustor 12 will operate in the range of between 1500° F. and 2800° F. exit temperature. A clean fossil fuel can be conventionally provided at the burner 28 by the piping 30 for initiation of the solid combustion process. A suitable flow control valve 32 and meter 34 are installed in the fuel oil line 30 in conventional manner for system control purposes. To achieve optimum combustion conditions, an oxidizer, such as oxygen can be directly introduced into the interior of the solids combustor 12 through the branch oxygen piping line 36 and the oxygen flow control valve 38. An oxidizer such as but not limited to oxygen, can be stored on the site in a suitable tank 84 which supplies the branch line 36 through a usual flow control valve 86. A control valve 38 provides optional oxygen enrichment within the combustion chamber 12.

The liquids combustor 14 comprises a fluid atomized burner 40 and is breeched into the afterburner 16 orthogonally with respect to the solids combustor 12. No. 2 fuel oil or other suitable fossil fuel (not shown) is fed from a conventional source 104 through a pump 106 to the burner 40 through the branch line 42, which preferably includes a conventional flow control valve 44 and a flow meter 46 in the usual manner. The invention is not limited to the use of fuel oil in the liquids incineration process. Other fuels, such as gas, pulverized coal, etc. may also advantageously be employed when and if so desired and still be within the scope and intent of this invention. To provide optimum combustion conditions, oxygen or other oxidizer is fed from the tank 84 to the burner 40 through the oxygen branch line 48, which preferably includes an oxygen flow control valve 50. Additionally, the burner 40 is provided with primary and secondary combustion fluid, for example air, in usual manner through the combustion air branch line 56 which preferably includes a combustion air control valve 58. Under optimum operating conditions and with controlled oxygen flow through the oxygen branch line 48 and control valve 50, it is anticipated that the liquids combustor 14 will function in the operating temperature range of between 1800° F. and 3000° F., depending upon the nature of the liquid wastes to be burned.

It is noteworthy that complete operational control of the burner 40 can be achieved by regulation of the primary and secondary combustion air through the branch duct drop off 224 and its control valve 228 and orifice 226 together with optional oxygen enrichment at the burner 40 by providing the capability of introducing oxygen through the line 48 and control valve 50 to either the primary or secondary combustion air.

The afterburner 16 receives all of the combustion products from the solids combustor 12 and liquids combustor 14 and includes a plurality of Zone I and Zone II burners 60, 62 which are longitudinally spaced along the length of the afterburner chamber. A fossil fuel branch line 64 feeds fuel to the plurality of Zone II burners 60 through a flow control valve 66 and a meter 68. Similarly, the plurality of Zone I burners 62 is provided with fuel through the Zone I fuel branch line 70 which includes the flow control valve 72 and the meter 74. The burners in each zone are arranged in opposed pairs for creation of induced turbulence in the afterburner 16 as the burners in each zone are activated. The computer (not shown) continuously monitors the afterburner and other system components to maintain an excess oxygen supply of approximately 3% over stoichiometric demand to assure complete combustion of all introduced materials. Combustion air for the Zone II plurality of burners 60 is provided by the fan 214 through the Zone II combustion air line 76 which includes a combustion air flow control valve 78. Similarly, the Zone I plurality of burners 62 is provided with combustion air from the fan 214 through the Zone I combustion air branch line 80, which preferably includes the right flow control valve 82 for combustion control purposes.

In operation, liquid wastes are pumped from a vessel (not shown) to an unloading station 90 including a screen which retains excessively large particles or lumps. From the unloading station, the liquids pass through a viscosity control of known construction and are delivered through a sensor train under pressure to the flow control section before entering the burner 40.

Spillage and ground water run off are collected in the integral sump (not shown). A pump 92 discharges the collected liquids to a holding tank 94 wherein the nondisolved or suspended heavy hydrocarbons and other materials are removed by a skimming device of known construction. The skimmings are fed through the discharge lines 96, 98 into the solids combustor 12. The liquid is fed by a pump 100 through an activated carbon filter 102 where dissolved organic matter is adsorbed from the water. The spent carbon is sent to the solids combustor 12 through the discharge line 98 and the water is fed into the recirculating process liquor system at the filter beds and thus constitutes part of the makeup water.

Figure 1B:
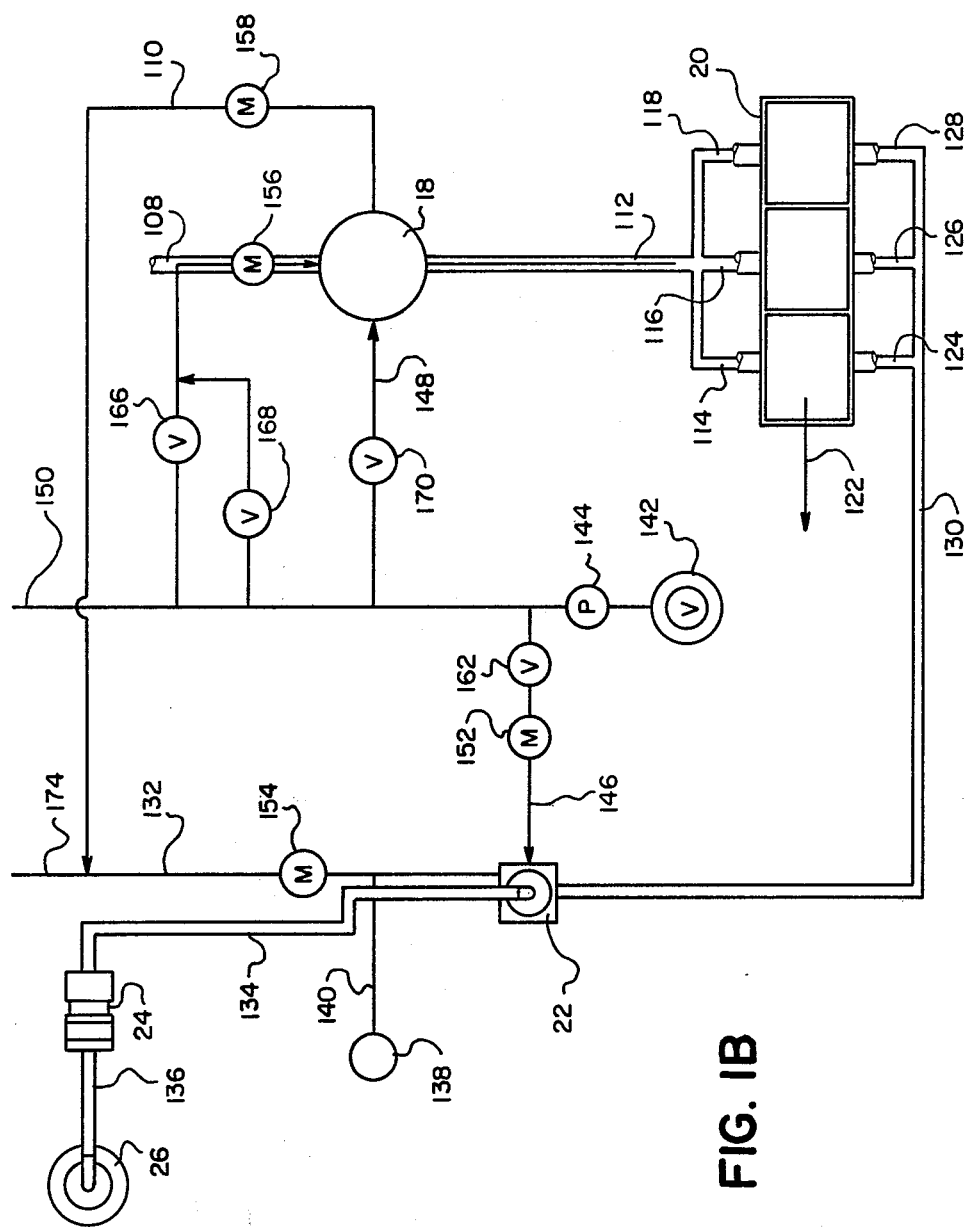

As best seen in FIGS. 1A and 1B, solid wastes are directed as indicated by the arrow 104 into the intake or hopper of the solids combustor 12 for incineration and processing by the incineration system 10. Both solid waste materials as indicated by the arrow 104 and semisolid components of the liquid waste materials as indicated by the combined discharge line 98 can be fed either alternately or simultaneously into the intake hopper of the solids combustor 12 for processing in the incineration system 10. The solids combustor 12 connects into the afterburner 16 through a suitable breeching 120 wherein the plurality of left and right burners 60, 62 function to maintain the mean temperature throughout the length of the afterburner at between 2200° F. and 3000° F. as necessary, to achieve complete combustion, depending upon the specific composition of the materials being burned in the solids combustor 12 and/or the liquids combustor 14.

The temperture range in the afterburner 16 will be automatically monitored and controlled by a computer functioned direct digital control system (not shown). Any upset condition in either the solids combustor or the liquids combustor will be noted by the appropriate monitoring devices to interrupt the waste feed and impose preemptive conditions to activate the plurality of burners 60, 62 automatically to maintain temperature.

The flue gases exit from the afterburner through the breeching 108 and enter the pollution control system at the conditioning unit 18 wherein a spray solution of controlled composition and pH is employed. In the conditioner unit 18, chemicals are released in solid, particulate or gaseous form and are either entrained in the moving gas stream or are captured by spray droplets which fall to the drain line 110. Other agents not necessarily in particulate form are also in part entrained into the moving gas stream or captured by falling droplets. The balance of additives and known captured particulates are entrained in the moving equilibriating mixture of flue gas and evaporated moisture.

The gaseous equilibriating mixture then exits the conditioner and enters the bag house through the plurality of branch ducts 114, 116, 118 wherein the entrained solid particulate phase which originated from the combustors 12, 14 or where added at the conditioner are deposited on the surface of the filters while the gaseous phase passes through the filter. At this point the particulate agents released in the conditioner react with certain of the gaseous components thereby capturing certain pollutants by combining them with the solids on the surface of the fabric filters (not shown). The pollution control system is designed to provide acceptably clean stack emission without a corresponding aqueous base discharge from the system. Actually the influx of water from the well 142 or other source is used or cleaned entirely for reuse. The gaseous water which originated in the conditioner is condensed at the scrubber 22 after passing through the baghouse 20 and is thus reintroduced into recirculating process liquor at the drain line 132. Well water or cleaned sump water is also introduced into the process liquor in proportion to make up for evaporative losses. Particulate matter will be extracted for disposal as indicated by the disposal line 122. The remaining moisture is purified in the baghouse 20 wherein elevated temperatures in the neighborhood of 500° F. vaporize any remaining moisture for exit through the baghouse exhaust ducts 124, 126, 128, 130. The air pollution control system is so designed and configured to produce filtrates and precipitates in the dry state as opposed to the usual sludges and slurries. Thus, the extracted materials can be disposed in dry form as indicated by the disposal line 178 and the disposal line 122 to facilitate handling procedures. Additionally, when economically feasible, the configuration allows for the selective extraction of recoverable materials having value.

The baghouse exhaust duct 130 directs the flue gases to the scrubber 22, which may be of the packed column type, wherein the greater part of the remaining moisture is condensed. In the scrubber 22, the exhaust gases at approximately 400° F. to 600° F. are contacted with a controlled pH liquor at between 110° F. and 120° F. whereby the liquor, with condensed moisture, passes downwardly and the scrubbed gases flow upwardly and exit the scrubber 22 through the clean gas exhaust duct 134. The conditioned and cleaned flue gases are pulled through the exhaust duct 134 by the induced draft fan 24 in usual manner for exhaust through the duct 136 and stack 26 to atmosphere. Sludge from the scrubber will be mechanically de-watered in the system and the resulting filter cake will be proportionately fed along with solid waste into the solids combustor 12 and indicated by the line 191. Still referring to FIGS. 1A and 1B, it will be seen that a chemical feeder or feeders 138 supplies a branch line 140 with any necessary additional chemicals to the scrubber drain line 132 or to the conditioner drain line 110 as may be necessary to maintain the requisite chemical nature of the system, and preferably between 8 to 10 pH. Automatic controls (not shown) regulate the function and operation of the feeder or feeders 138.

Water necessary for operation of the system can be supplied from a convenient, known, source, such as the well 142 wherein it is drawn by the pump 144 in sufficient quantities to make up any water expended or lost in the treatment process. It is noteworthy that the system functions without an aqueous based discharge. Rather, the system actually requires an influx of water without an attendant aqueous discharge. The make up water is normally pumped to the scrubber 22 through the scrubber water line 146, and is also connected through a conventional automatic valve to the conditioner 18 through the conditioner water branch line 148 and to the solids combustor 12 through the solids combustor branch line 150. Suitable meters 152, 154, 156, 158 and 160 are provided to monitor flow through out the system. Similarly, control valves 162, 164, 166, 168 and 170 are provided and installed to control water flow in response to operating conditions.

At the conditioning unit 18 the water flow control includes a flow control valve 166 which is regulated by computer (not shown) to maintain a gas temperature from the conditioner of approximately 450° F. A parallel liquid control valve 168 which is also normally closed and set to deploy by mechanical actuation and control the gases exiting the conditioner 18 at approximately 500° F. A third parallel valve 170 is normally closed and is set to open at 600° F. in case of failure of the valves 166 and 168. The disposal drain line 110 and the conditioner 18 includes the meter 158 and proceeds directly to the ash pit 172. The drain from the scrubber 22 passes through a meter and thence to the ash pit. Water and ash from the solids combustor 12 enter directly the ash pit 172 through the solids combustor downcomer 176. Ashes from the ash pit 172 are mechanically withdrawn for disposal in known manner as indicated by the disposal line 178.

All liquids in the ash pit 172 are elevated by the pump 180 and introduced to the cooling tower 182 through the ash pit line 184. After cooling, exhaust water from the cooling tower 182 drains through the cooling tower exhaust line 186 into the sand filter 188 in known manner. Any accumulation in the sand filter 188 can be directed to the intake of the solids combustor 12 for disposal by the system through the incinerator sludge line 191. If necessary, a suitable pump (not shown) could be provided in this line to maintain flow during the operational cycle. Filtered water, after cleaning in the sand filter 188, flows by gravity through the filter line 192 into the holding tank 194 wherein it is retained for system supply purposes, in response to the system controls. For this purpose, a pump 196 draws its suction from the holding tank 194 to supply water as necessary through the water line 198 into the water system, whenever required for optimum operating conditions.

In operation, combustible liquid waste (not shown) is introduced through a suitable strainer into the liquid waste holding tank 90 by the liquid waste line 88. The liquid wastes are then pumped through the discharge line 202 by operation of the pump 200 to enter the liquid waste burner 40. Flow control through the liquid waste line 202 is maintained by the valve 204. As illustrated, skimmings (not shown) from the holding tank 94 are withdrawn through the skimmings flow line 96 wherein the skimmings can be incinerated at the solids combustor 12 as indicated by disposal line 98. Similarly, spent carbon (not shown) from the activated carbon tank 102 can also be introduced into the solids combustor for disposal as indicated by the combined disposal line 98. It is noteworthy that various fuels, combustible wastes, additives and oxidizing agents in addition to primary and secondary fluids of combustion may be provided at the burner 40 as may be most desirable to suit the actual operating conditions. While the primary and secondary combustion fluids have herein been described as air and the oxidizing agent has been identified as oxygen, it will be understood that the invention is not so limited and other operational fluids may be employed where it appears desirable to do so.

Figure 2:
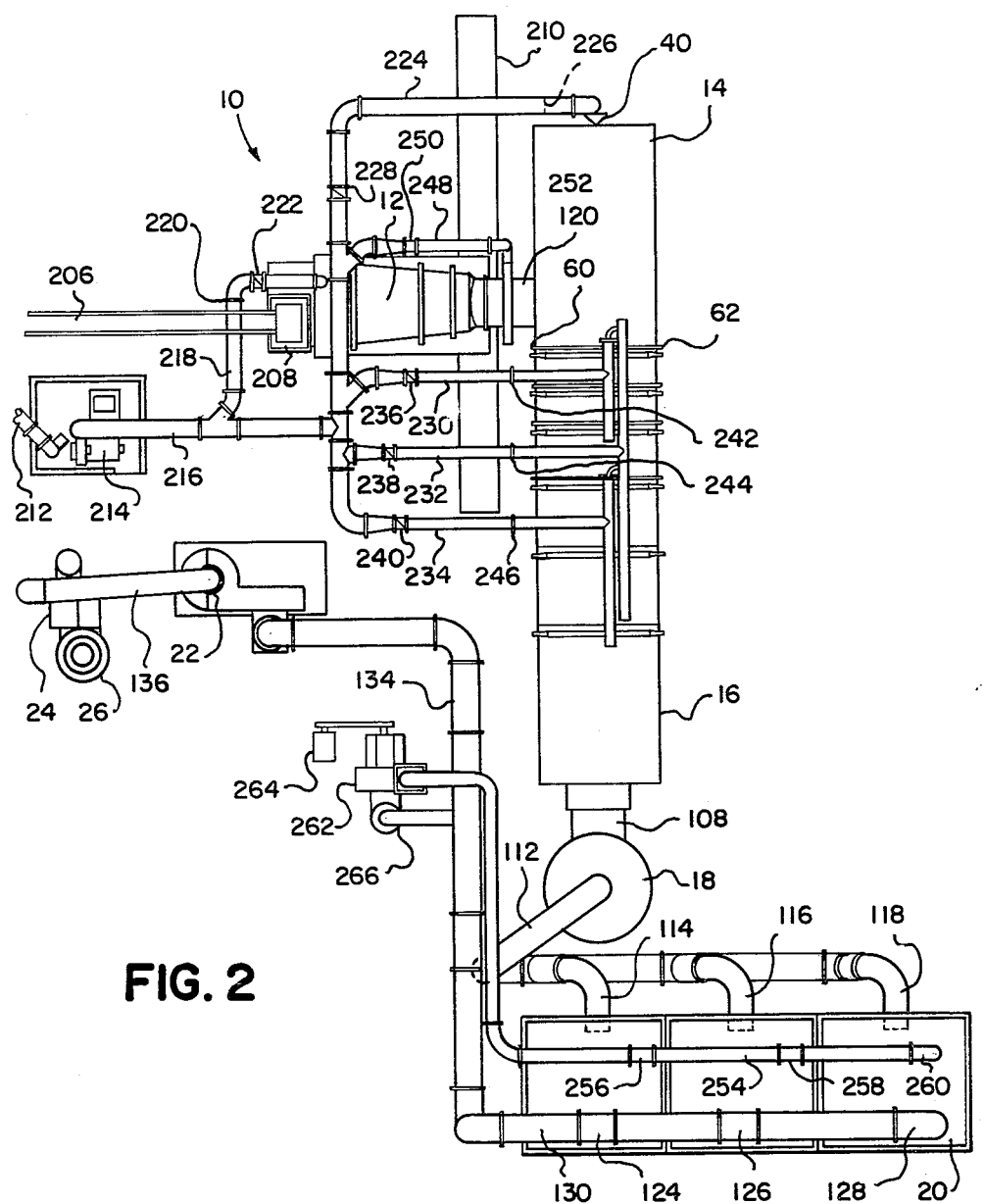
FIG. 2 is a partial top plan view of the system illustrated in FIG. 1, showing particularly the flue gas and forced combustion air handling systems.

Referring now to FIG. 2, additional features of the incineration system 10 can now be described. Preferably, a solids conveyor 206 is provided to automatically convey solid wastes (not illustrated) into the hopper 208 of the solids combustor 12 for incineration therewithin. Incinerated waste materials from the solids combustor 12 can be discharged to a suitable point of disposal through the ash conveyor 210 in known manner.

Forced combustion air for incineration purposes is drawn through the fan suction 212 by the forced draft fan 214 and is discharged at suitable static pressure through the forced combustion air duct 216. Combustion air to support combustion within the solids combustor 12 is supplied through the combustor branch drop off 218. The branch drop off 218 is equipped with a suitable control orifice 220 and control valve 222, which controls are provided to permit complete regulation of the air flow of the solids combustor for optimum combustion therewithin. Similarly, the liquids combustor branch drop off 224 supplies primary and secondary combustion air to the burner 40 through a control valve 228 and an orifice 226. As illustrated, the forced combustion air duct 216 also supplies combustion air to the plurality of afterburner oil burners through the afterburner drop offs 230, 232, 234 each of which is provided respectively with a control valve 236, 238, 240 and an orifice 242, 244, 246 as illustrated for flow control purposes. Additionally, an upset condition branch 248 is provided at the solids combustor and is similarly equipped with a control valve 250 and orifice 252 to reroute the air as may be required for the contingency when the solids combustor 12 may be overcharged.

It is contemplated that when the solids combustor 12 is overcharged, the computer control system (not shown) will sense the absence of an adequate supply of oxygen and will function to interrupt the rocking motion of the combustor, will set the valve 222 to a minimum opening and will deploy the valve 250 to ignite the pyrolysis product. The system is programmed to automatically enter the pyrolysis mode when there is an upset, such as an overcharge in the solids combustor. The system is designed to function with an excess of oxygen over demand of three percent. Top priority is given to supplying adequate air to ensure continued complete and efficient combustion through the afterburner 16 and the remainder of the available air is diverted through the valve 228 to the main burner 40. This state continues until the overcharge is eliminated. The system then automatically returns to a normal mode of operation.

Still referring to FIG. 2, it will be seen that the baghouse 20 is equipped in known manner with a baghouse cleaning duct 254 including a plurality of outlets 256, 258, 260. The baghouse cleaning duct 254 is connected to the reverse air fan 262 to provide air cleaning facilities. The reverse air fan 262 includes a motor 264 to drive the fan 268 and a suction duct 266 in usual manner for conventional cyclical operation. As previously described, the baghouse exhaust duct 130 is employed to exhaust baghouse gases in the form of steam to the scrubber 22. After treatment in known manner within the scrubber system 22, the clean gas exhaust duct 134 leads the cleaned and scrubbed flue gases to the induced drafted fan 24 and thence out the stack 26 to atmosphere.

It is contemplated that the entire plant will be operating using direct digital control with manual backup. Key physical and chemical variables such as temperature, pressure, moisture content, viscosity, density, free oxygen and so forth will be continuously monitored and such real time data will be used by the computer to closely control the process. Combustion will be closely controlled and regulated within the solids combustor 12 and the liquids combustor 14 to provide for optimum results with respect to the destruction capability of the incineration system. While not specifically illustrated, in known manner, the system can efficiently utilize the heat generated by the combustion processes in the solids combustor and the liquids combustor by employing suitable heat exchangers, turbines, generators and necessary ancilliary controls and equipment in conventional arrangement to simultaneously produce a steady, reliable source of electrical energy.

Although the invention has been described with a certain degree of particularity, it is understood that the present disclosure has been made only by way of example and that numerous changes in the details of construction and the combination and arrangement of parts may be resorted to without departing from the spirit and scope of the present invention.

What is claimed is:

1. In an industrial incineration system, the combination of
   a solids combustor means including a solids waste inlet and a flue gas outlet,
      the solids combustor means being adapted to incinerate solid and semi-solid waste materials primarily without the addition of liquid of gaseous fuel;
   a liquids combustor means including a burner, a liquids waste inlet and a flue gas outlet,
      the liquids combustor means being adapted to incinerate liquid waste materials primarily without supplemental fuels at elevated temperatures;
   an afterburner means including a combustion chamber having an outlet, a first breeching inlet to the combustion chamber to which the flue gas outlet of the solids combustor means is connected and a second breeching inlet to the combustion chamber to which the flue gas outlet of liquid combustor means is connected,
      the first breeching inlet being adapted to direct products of combustion gases of the solids combustor means into the combustion chamber,
      the second breeching inlet being adapted to direct products of combustion gases of the liquids combustor means into the combustion chamber,
   fuel burning means positioned in the afterburner combustion chamber to elevate and maintain elevated temperatures within the combustion chamber;
   air pollution control system means receiving products of combustion gases from the combustion chamber outlet to clean the gases,
      the air pollution control system means comprising at least a gas conditioning unit, a high temperature baghouse and a gas scrubber;
   means to introduce an adequate supply of oxygen to the liquids combustor means, to the solids combustor means and to the afterburner means for combustion purposes; and
   means to maintain an excess of oxygen over demand in the afterburner means under all conditions of load in the solids combustor means.

2. The incineration system of claim 1 wherein the solids combustor means comprises an oscillating combustion chamber.

3. The incineration system of claim 2 and oxydizer means communicating with the solids combustor to introduce an oxydizer into the oscillating combustion chamber to enhance the incineration of the solid waste materials.

4. The incineration system of claim 1 and means to introduce a fuel and primary combustion air to the burner.

5. The incineration system of claim 4 and oxydizer means connected with the burner to introduce an oxydizer into the liquids combustor to enhance the incineration of the liquid waste materials.

6. The incineration system of claim 1 wherein the air pollution control system means comprises a water inlet to supply water to the gas conditioning unit and to the gas scrubber and means to use the water to clean the gases without discharge from the system.

7. The incineration system of claim 6 wherein the air pollution control system comprises a filter receiving liquid from the gas conditioning unit and the gas scrubber to clean the water for reuse with the system.

8. The incineration system of claim 6 and chemical feed means to feed chemicals to the conditioning unit and to the gas scrubber to maintain specific system conditions.

9. The incineration system of claim 7 wherein the filter comprises means to separate solids in the liquid from the water whereby the solids may be removed from the air pollution control system in substantially dry form.

10. The incineration system of claim 1 and forced combustion air means to feed combustion air to the solids combustor, to the liquid combustor and to the afterburner fuel burning means.

11. The incineration system of claim 10 wherein the forced combination air means comprises a branch drop off duct to the solids combustor means and a branch drop off duct to the liquids combustor means.

12. The incineration system of claim 11 wherein the said branch drop off ducts are each equipped with a control valve.

13. The incineration system of claim 11 or 12 wherein the said branch drop off ducts are each equipped with an orifice.

14. The incineration system of claim 11 wherein the afterburner fuel burner means comprise a plurality of pairs of transversely opposed right and left afterburner burners.

15. The incineration system of claim 14 wherein the forced air means comprises a plurality of branch drop off ducts to supply combustion air to the plurality of afterburner burners.

16. The incineration system of claim 15 wherein each of the plurality of afterburner branch drop off ducts is equipped with a control valve and an orifice.

17. The incineration system of claim 1 wherein the first breeching inlet is angularly offset from the secon breeching inlet relative to the longitudinal axis of the afterburner means.

18. The incineration system of claim 1 wherein the means to maintain an excess of oxygen comprises a computer.

19. The incineration system of claim 1 or claim 18 wherein the means to maintain comprises a monitor.

20. The incineration system of claim 1 wherein the means to maintain an excess of oxygen is adapted to maintain an excess of at least three percent.

* * * * *